United States Patent [19]
Neuberg et al.

[11] 4,151,223
[45] Apr. 24, 1979

[54] FLAME-RETARDANT FIBERS AND FILAMENTS OF LINEAR THERMOPLASTIC POLYESTERS CONTAINING HALOGENATED OLIGOMER OF STYRENE

[75] Inventors: Rainer Neuberg, Dannstadt-Schauernheim; Klaus Penzien, Frankenthal; Hans G. Matthies, Ludwigshafen, all of Fed. Rep. of Germany

[73] Assignee: BASF Aktiengesellschaft, Fed. Rep. of Germany

[21] Appl. No.: 833,062

[22] Filed: Sep. 14, 1977

[30] Foreign Application Priority Data

Oct. 9, 1976 [DE] Fed. Rep. of Germany ....... 2645711

[51] Int. Cl.$^2$ .............................................. C08G 39/02
[52] U.S. Cl. ................................. 260/873; 260/40 P; 260/45.7 R; 260/DIG. 24; 526/293
[58] Field of Search .......... 260/45.7 R, 873, DIG. 24, 260/91.5; 521/98, 131

[56] References Cited
U.S. PATENT DOCUMENTS 3,474,067  10/1969  Praetzel et al. ............. 260/897 C X
3,975,354   8/1976  Buxbaum et al. ................. 260/40 R

OTHER PUBLICATIONS

Lyons, *The Chemistry and Uses of Fire Retardants,* (Wiley, 1970), p. 387.

*Primary Examiner*—Thomas De Benedictis, Sr.
*Attorney, Agent, or Firm*—Keil & Witherspoon

[57] ABSTRACT

Fibers and filaments of linear thermoplastic polyesters, containing halogen-containing flameproofing agents and synergistic agents therefor, in which the flameproofing agents are chlorinated and/or brominated oligomeric styrenes. The fibers and filaments of the invention are used for the manufacture of textiles of low flammability.

5 Claims, No Drawings

FLAME-RETARDANT FIBERS AND FILAMENTS OF LINEAR THERMOPLASTIC POLYESTERS CONTAINING HALOGENATED OLIGOMER OF STYRENE

The present invention relates to flame-retardant fibers and filaments of linear thermoplastic polyesters.

Processes for flameproofing fibers of linear polyesters have been disclosed. For example, it has been proposed to introduce halogen-containing or phosphorus-containing monomers into the molecular chain as integral constituents of the chemical structure. The principal disadvantage of this approach is that the molar concentration of the comonomers required to achieve the desired degree of non-flammability is generally so high that the end product has entirely different physical properties from those of conventional polyesters and is therefore less suitable for the manufacture of fibers.

It has also been proposed to admix halogen-containing organic compounds to the polyester. Such compounds however mostly act as pigments and thus adversely affect the mechanical properties of the fibers. A further disadvantage of such additives is that when washing or drycleaning is necessary, such treatment easily removes the additives from the fibers. Furthermore, such additives are frequently substances of high melting point (for example the melting point of decabromodiphenyl ether=306° C.), which presents problems in using them for relatively low-melting polymers. In addition, such compounds tend to be very volatile at high temperatures, leading to the known plate-out effect.

It is an object of the present invention to provide new flame-retardant polyester filaments and fibers with improved properties compared to the prior art.

We have found that this object is achieved by polyester filaments and fibers based on linear, saturated polyesters which contain a halogen compound as flameproofing agent and a conventional synergistic agent therefor, e.g. $Sb_2O_3$, when the fibers and filaments contain a chlorinated and/or brominated oligomeric styrene as the flameproofing agent.

The fibers and filaments of the invention have the advantage that their flame-retardant finish is durable and that they do not lose this property even after repeated cleaning. They have the further advantage that the flameproofing agent does not migrate out and has little effect on the dyeability. Furthermore, there is little effect on the textile properties of the filaments and fibers.

The degree of polymerization of the oligomers is preferably from 3 to 100, especially from 3 to 20, and cyclic oligomers may also be used. According to a preferred embodiment of the invention, the chlorinated and/or brominated oligomeric styrenes to be employed have the formula I shown below, where X=Cl or Br (individual X's being identical or different), R=H or an aliphatic radical, especially an alkyl radical, e.g. $CH_3$ or $C_2H_5$, m is an integer from 1 to 5, and n is the degree of polymerization.

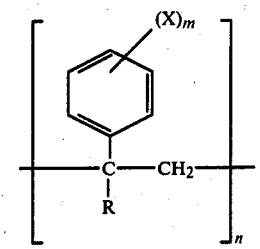

The oligomeric styrenes may of course contain chlorine and bromine simultaneously.

Amongst the halogen substituents X, bromine is particularly preferred; advantageously, the oligomeric styrenes contain from 40 to 80% by weight of bromine. They may be manufactured by, for example, bromination of hydrogenated oligomeric styrenes. Brominated oligomeric styrenes produced from naturally occurring oligostyrenes may also be used, though their heat stability is lower than that of the first-mentioned brominated oligomeric styrenes. The flameproofing agents obtainable by polymerizing bromostyrenes can also be used, as can the brominated oligostyrenes obtainable from styrene and bromine by a single vessel process.

Virtually all conventional synergistic agents may be used as the synergistic agents for the brominated oligomric styrenes; oxides of metals of group Vb of the periodic table, especially antimony trioxide, are particularly preferred. Antimony trioxide which has been precipitated on suitable inorganic carriers, e.g. finely divided kaolin, calcined kaolin or talc, it particularly active.

The amount of brominated oligostyrenes required for the flameproofing of polyester fibers depends on the bromine content of the oligostyrenes; the bromine content in the fibers or filaments of the invention may be, for example, from 2.0 to 20%, preferably from 5 to 15%, by weight. The amount of $Sb_2O_3$ is from 2 to 10%, preferably from 3 to 6%, by weight. In addition, conventional antidrip additives, e.g. colloidal $SiO_2$, may also be added.

The preferred linear saturated polyester is polyethylene terephthalate, which may be modified with up to 15 mole% of other dicarboxylic acids or diols.

Examples of suitable modifiers are aliphatic dicarboxylic acids of up to 20 carbon atoms, cycloaliphatic dicarboxylic acids or aromatic dicarboxylic acids with 1 or 2 aromatic rings. Specific examples are adipic acid, sebacic acid, cyclohexanedicarboxylic acid, isophthalic acid and 2,7- and 2,6-naphthalenedicarboxylic acid. Suitable alcoholic modifiers are in particular aliphatic and cycloaliphatic glycols of 2 to 20 carbon atoms. Examples are propylene glycol, butylene glycol, hexamethylene glycol, neopentyl glycol and 1,4-bis-hydroxymethylcyclohexane.

The chlorinated and/or brominated oligostyrenes can be introduced into the linear, saturated polyester fibers or filaments at any stage of their process of manufacture in order to produce the compositions of the present invention. In general, they are added before production of the fiber, toward the end of the manufacture of the polyesters, or during the spinning process. In a preferred process of manufacture, the brominated oligostyrenes are added to the molten polyester during melt spinning and the molten mixture is spun in the conventional manner to give filaments or fibers.

The relative viscosities $\eta_{rel}$ of the polyesters were determined in a 3:2 mixture of phenol and o-dichlorobenzene.

The LOI text is used below as a criterion for assessing the flame-retardant properties of the fibers and filaments of the invention. This test is carried out as follows: a vertically arranged sample, in a combustion tube through which a mixture of oxygen and nitrogen flows at a defined velocity, is ignited at the top by means of a gas flame. The ratio of oxygen to nitrogen in the mixture is then varied until the sample burns away uniformly with a minimal flame. The LOI value is then calculated as follows $$LOI = \frac{[O_2]}{[O_2] + [N_2]} \cdot 100$$

Accordingly, the LOI value indicates the percentage proportion of oxygen, in an oxygen/nitrogen mixture, which is just sufficient to allow the vertically clamped sample to burn away uniformly from top to bottom.

The test used below to determine the non-extractability of flameproofing additives was carred out as follows: 10 g of the fibers to be examined were boiled in 350 ml of an organic solvent (e.g. trichloroethylene) for 6 hours under reflux.

The filaments and fibers according to the invention can be used for the manufacture of textiles of low flammability, e.g. carpeting or curtains.

The Examples which follow illustrate the invention.

EXAMPLE 1

Dried polyethylene terephthalate (K value 56) is mixed, in a mixing extruder, with the particular amount of brominated oligostyrene at from 280° to 300° C. and the melt is extruded, into a water bath, as strands which are then granulated. The polyester chips thus obtained are then melt-spun by conventional processes.

EXAMPLE 2

In a modified procedure, the relevant amount of brominated oligomeric styrene is added to a molten polyethylene terephthalate (K value 60) in a spinning extruder, and the melt is spun to give fibers or filaments.

The results obtained are set in the following Table as compared with other halogen-containing additives introduced in the same way.

The procedures in the two Examples give essentially similar results.

TABLE I:

EXTRACTION TEST
Polyethylene terephthalate fibers with brominated oligostyrenes as a flameproofing additive

| Br content of the fibers | | LOI value of |
|---|---|---|
| before extraction | after extraction | the fibers |
| 2.5% | 2.1% | 24.5 |
| 5.6% | 4.4% | 26.0 |
| 6.3% | 5.2% | 26.5 |
| 9.4% | 6.4% | 28 |
| 12.6% | 8.1% | 29 |
| 13.5% | 8.5% | 29.5 |
| 15.7% | 9.5% | 30 |

| | Halogen content of the fibers | |
|---|---|---|
| Type of additive | before extraction | after extraction |
| Hexabromodiphenyl | 3.4% Br | 0.5% Br |
| | 8.5% Br | 0.8% Br |
| | 11.5% Br | 0.9% Br |
| 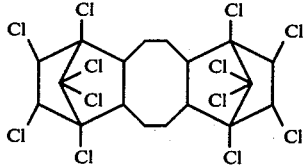 | 7.9% Cl | 0.6% Cl |
| | 10.8% Cl | 0.8% Cl |

We claim:

1. Fibers of filaments for textile uses, comprising linear, thermoplastic polyester which contains, as a flame-proofing agent, a chlorinated and/or brominated oligomer of styrene with a degree of polymerization of 3 to 20 and a synergistic agent therefor.

2. Fibers or filaments as claimed in claim 1 wherein said flameproofing agent has the formula

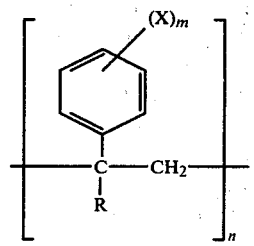

I where X is chlorine or bromine, R is hydrogen or an aliphatic radical, especially H or lower alkyl, n is an integer from 3 to 20 and m is an integer from 1 to 5.

3. Fibers or filaments as claimed in claim 1 wherein said flameproofing agent is brominated oligomeric styrene, and the bromine content of the fibers or filaments is from 2.0 to 20%

4. Fibers or filaments as claimed in claim 1 wherein the polyester is polyethylene terephthalate.

5. Fibers or filaments as claimed in claim 1 wherein the synergistic agent is antimony trioxide.

* * * * *